United States Patent [19]
Wakasa et al.

[11] Patent Number: 5,982,296
[45] Date of Patent: *Nov. 9, 1999

[54] DATA SWITCHING PROCESSING METHOD AND APPARATUS

[75] Inventors: Shinji Wakasa; Susumu Tominaga, both of Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/420,417

[22] Filed: Apr. 12, 1995

[30] Foreign Application Priority Data

Jun. 30, 1994 [JP] Japan .................................. 6-150012

[51] Int. Cl.$^6$ .................................................. H04L 12/56
[52] U.S. Cl. ............... 340/827; 340/825.07; 340/825.52; 370/236; 370/392; 370/415
[58] Field of Search ............................... 340/825.07, 827, 340/825.15, 825.05, 825.52; 379/207, 216, 112, 89, 229, 230, 196, 197; 370/364, 427, 413, 231, 235, 236, 351, 355, 389, 392, 412, 415; 395/311; 710/131

[56] References Cited

U.S. PATENT DOCUMENTS

| | | | |
|---|---|---|---|
| 4,032,899 | 6/1977 | Jenny et al. ............................ | 395/311 |
| 4,890,280 | 12/1989 | Hirata ....................................... | 370/60 |
| 5,309,426 | 5/1994 | Crouse et al. ......................... | 370/58.1 |
| 5,526,344 | 6/1996 | Diaz et al. ........................... | 370/58.2 X |

FOREIGN PATENT DOCUMENTS

2 026 818  2/1980  United Kingdom .................. 370/58.2

*Primary Examiner*—Brian Zimmerman
*Assistant Examiner*—William H. Wilson, Jr.
*Attorney, Agent, or Firm*—Helfgott & Karas, PC.

[57] ABSTRACT

A plurality of modules, each connected to communication lines, are interconnected by a logically separated interprocessor communication bus for transferring header information and control information and a frame transfer bus for transferring data. When each module receives data from a line, the module generates a header containing header information from the received data, stores the header and user data in respective queue-type data storage sections, and transmits the header on the interprocessor communication bus; when one of the other modules detects its own identification from the header on the bus, the module sends a data send request to the transmitting module which in response reads the data from the data storage and outputs it on the frame transfer bus for transmission to the requesting module.

32 Claims, 9 Drawing Sheets

DATA SWITCHING PROCESSING METHOD AND APPARATUS

BACKGROUND OF THE INVENTION

1. Field of the Invention

The present invention relates to a data switching processing method and apparatus for performing the switching of data units such as packets, frames, cells, etc., with addressing information included therein.

2. Description of the Related Art

In data switching networks, such as packet switching networks, frame relay switching networks, or cell switching networks, processing for switching is performed with a data unit, such as a packet, frame, or cell, as a unit, each data unit consisting of variable-length or fixed-length data and a header containing data addressing information appended to the data.

According to a prior art switching method, in switching processing equipment also, data is unconditionally transferred from the entrance to the exit side of the switching equipment with the variable-length or fixed-length data unit as a unit and in accordance with the addressing information included therein. This increases the complexity of processing at both the entrance and the exit side. Furthermore, for a data unit containing an error, it will be sufficient to only transfer the header from the entrance to the exit side, but in the above method, the whole data unit has to be transferred, which has been a major obstacle to the improvement of throughput.

Moreover, since congestion processing (discarding of data units, etc., in the event of congestion) is usually not performed at the entrance side, a buffer with a sufficient capacity has to be provided at both the entrance and the exit side.

SUMMARY OF THE INVENTION

It is an object of the invention to simplify the processing in the entrance and exit modules, improve throughput, and reduce the necessary buffer amount, by providing an improved data switching method by which data is transferred from the entrance to the exit side of switching processing equipment in accordance with addressing information.

According to the invention, there is provided a data switching processing method for switching a data unit transmitted over a plurality of communication lines by transferring the data unit from a source module that receives the data unit from a communication line connected thereto to a destination module connected to a communication line on which the data unit is to be transferred in accordance with addressing information included in the data unit, comprising the steps of: extracting from the data unit a header containing information for identifying the destination module; transferring the header to the destination module identified by the information; in response to the transfer of the header, issuing from the destination module a send request requesting the transmission of the data unit to the destination module; and transferring the data unit to the destination module in response to the send request.

According to the invention, there is also provided a data switching processing apparatus for switching a data unit transmitted over a plurality of communication lines by transferring the data unit from a source module that receives the data unit from a communication line connected thereto to a destination module connected to a communication line on which the data unit is to be transferred in accordance with addressing information included in the data unit, comprising: means for extracting from the data unit a header containing information for identifying the destination module; means for transferring the header to the destination module identified by the information; means for issuing from the destination module and in response to the transfer of the header a send request requesting the transmission of the data unit to the destination module; and means for transferring the data unit to the destination module in response to the send request.

DESCRIPTION OF THE PREFERRED EMBODIMENTS

Figure 1:
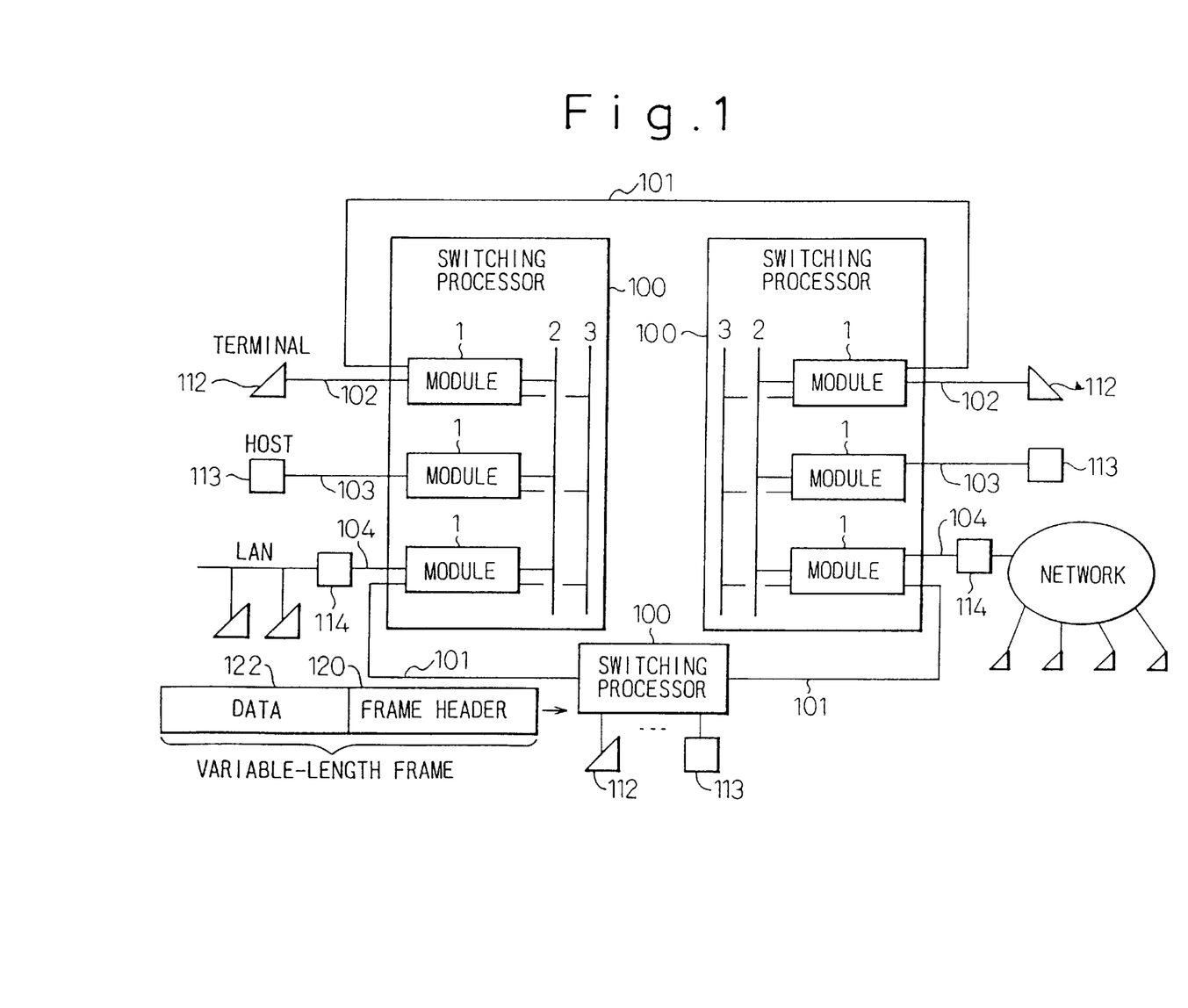
FIG. 1 is a diagram showing the system configuration of a switching network incorporating a switching processing apparatus according to the present invention.

FIG. 1 is a diagram showing the system configuration of a switching network incorporating switching processing apparatus according to the present invention.

In the figure, reference numeral 100 represents the switching processing apparatus. Each switching processing apparatus comprises one or more modules 1, plus a frame transfer bus 2 and an interprocessor communication bus 3 interconnecting the modules. Lines connected to the modules in each switching processing apparatus 100 include: a line 101 for data transfer (data switching) to and from other switching processing apparatus; a line 102 which connects to a terminal 112; a line 103 which connects to host equipment 113; and a line 104 which connects to an interface 114 of a local area network (LAN).

In the system configuration shown in FIG. 1, data from the terminal can be transmitted in cell, packet, frame, or other form. There are two data formats used: one in which a header, containing source, destination and other information, is appended to user data, and the other in which no independent headers are provided (source, destination and other information is included in a fixed area of user data). The present invention can be applied for either data format, but basically, it is assumed here that data input from the line is a variable-length frame consisting of a frame header 120 and variable-length data 122. When the header is not appended, a header for switching processing is generated using the source, destination and other information included in the user data. Also, when the header is appended, a separate header for transfer within the apparatus is usually generated.

Figure 2:
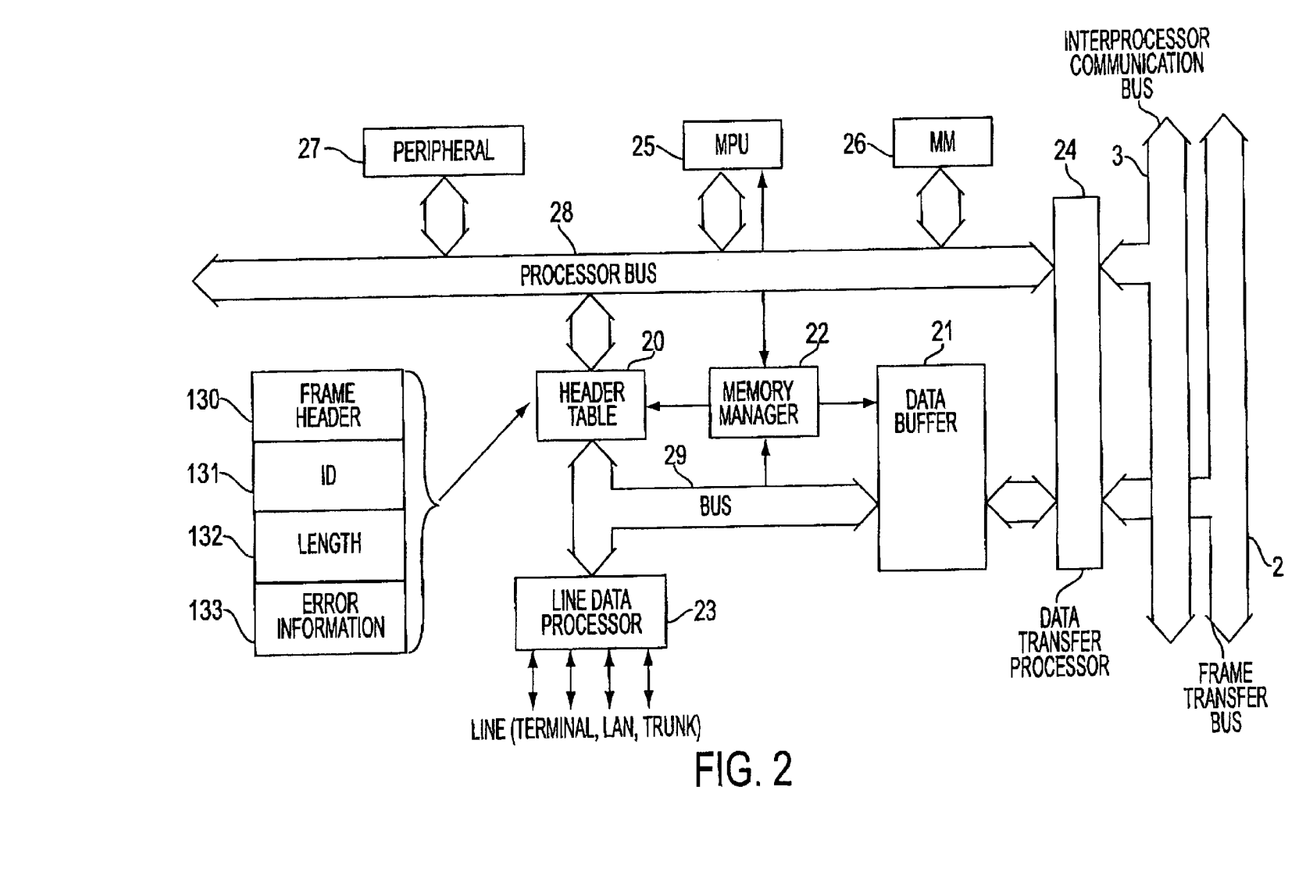
FIG. 2 is a diagram showing the configuration of one embodiment of the switching processing apparatus of the present invention.

The configuration and operation of one embodiment of the switching processing apparatus shown in FIG. 1 will be described below. FIG. 2 shows the configuration of one embodiment of the module constituting part of the switching processing apparatus according to the present invention. In FIG. 2, reference numerals 2 and 3 designate the frame transfer bus and interprocessor bus, respectively; 20 is a header table that stores headers and information for managing stored data; 21 is a data buffer for storing user data; 22 is a memory manager; 23 is a line data processor; 24 is a data transfer processor for processing transfer of data to and from the buses; 25 is a processor (designated as MPU; microprocessor unit); 26 is a main memory (MM) for storing data and programs that the MPU 25 uses; 27 is peripheral equipment such as a direct memory access controller (DMAC), an input/output device, an external storage device, etc. (generally designated as PERIPHERAL); 28 is a processor bus within the module; and 29 is a bus for transferring data between the line data processor 23, the header table 20, and the data buffer 21. To the line data processor 23 are connected a plurality of lines, which connect to a terminal, an interface for connection with a LAN, and an interconnecting line for connection to other modules.

The operation of the module shown in FIG. 2 will be described next. When data (cell, frame, packet, etc.) is input from one of the line to the line data processor 23, the line data processor 23 activates the memory manager 22 to initiate the operation for storing the received data. If the received data includes a header, the memory manager 22 converts the header to a header for intermodule transfer, if necessary, and the header thus converted is stored in the header table 20. If the data is not provided with a header, a header for intermodule transfer is generated. The contents of the header stored in the header table 20 at this time include, as shown in FIG. 2, a frame header 130 (a flag indicating the beginning of a frame, control information, etc.), ID 131 (source and destination logical channel numbers), length 132 (data size), and error information (information indicating the occurrence of congestion, CRC information for error detection, etc.). Construction of the header table 20 or updating of the contents of the stored header is done when the memory manager 22 stores user data in the data buffer 21.

Figure 3:
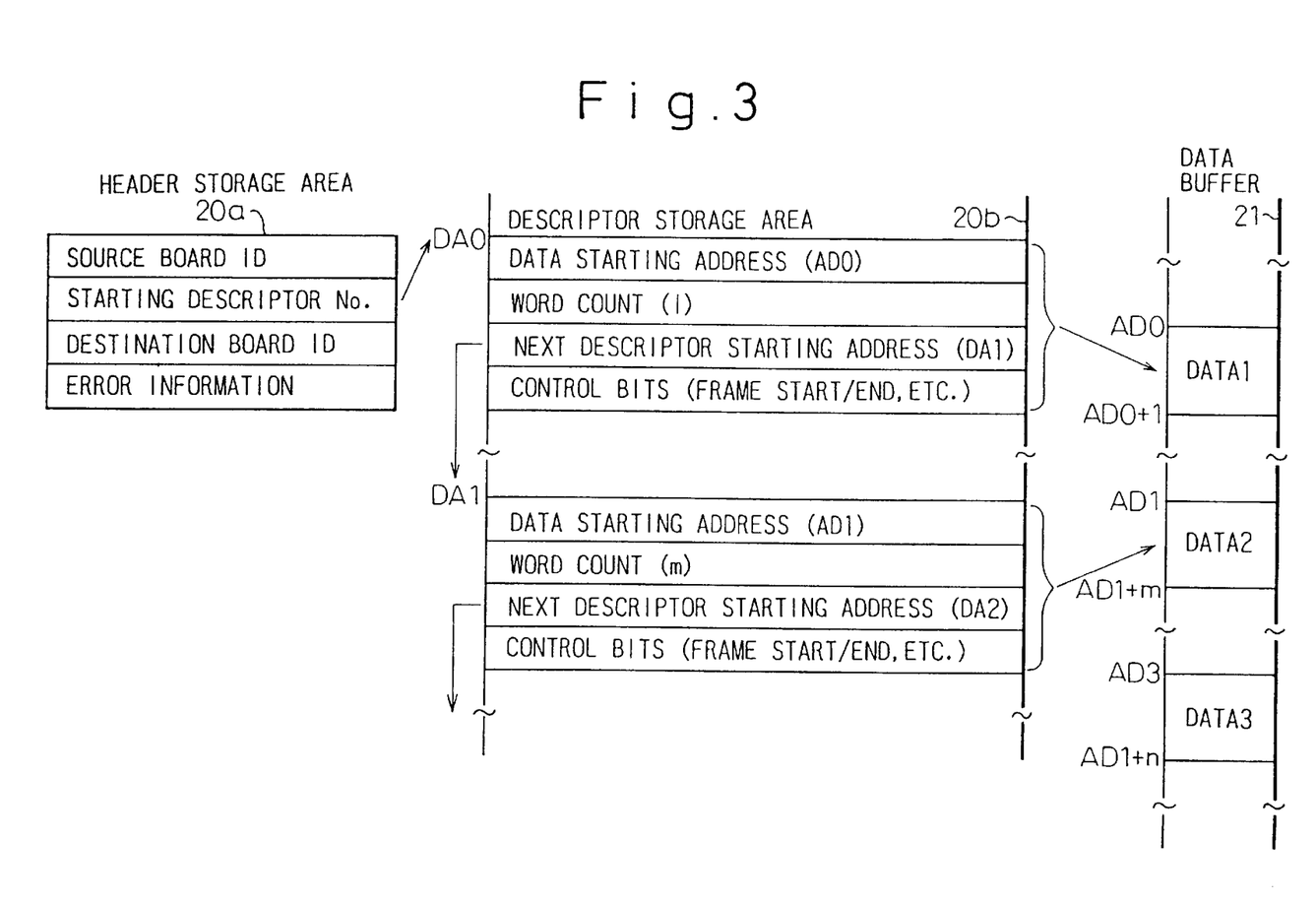
FIG. 3 is a diagram showing data format examples in a header table and a data buffer.

FIG. 3 shows data format examples in the header table 20 and the data buffer 21. Parts 20a and 20b of FIG. 3 form the header table 20: part 20a shows a header storage area and 20b a descriptor storage area. The header containing the frame header 130, ID 131, length 132, etc., received from the line shown in FIG. 2 is analyzed and processed by the memory manager 22 (or by the MPU 25) for transmission to the destination module, is converted to the header format shown in FIG. 3, and is stored in the header storage area 20a. The contents of the thus converted header consists of a source board ID (using the table, the source's logical channel number included in the received header is converted to the board ID identifying the board accommodating the source's line), a starting descriptor number (the number of the descriptor as an index pointing to the location of the user data stored in the data buffer 21, or in the case of a multiple-descriptor chain, the number of the descriptor at the head of the chain), a destination board ID (including the destination's line ID and the designation of the destination module), and error information. Since the user data is of variable-length, for efficient utilization of the storage the data is divided into fixed-length data blocks (data 1, data 2, ..., in FIG. 3) for storage in the data buffer 21, and a chain of descriptors corresponding to the respective data blocks are stored in the descriptor storage area of the header table 20.

When the header is received from the line data processor 23 in FIG. 2, the memory manager 22 recognizes the length (data length) contained in the header and also the beginning of an empty block chain available in the data buffer 21, and performs control to store the received user data (frame) by using a descriptor chain technique. For this purpose, the starting descriptor number (indicating address DA0 in the descriptor storage area 20b) is stored in the header storage area 20a, and at the address DA0 in the descriptor storage area 20b are stored the starting address AD0 in the data buffer 21 of the block (data 1) where the first part of the data is stored, the word count, the starting address DA1 of the next descriptor for the next block, and control bits (bits indicating the beginning and end of the frame, etc.)

When there is data 2 stored in the block succeeding the first block (data 1) in the data buffer 21, its corresponding descriptor is stored at address DA1, chained to the preceding descriptor, in the descriptor storage area 20b, and likewise, the starting address AD1 of that succeeding data block in the data buffer 21, the word count, etc., are stored.

In this manner, the data received from the line via the line data processor 23 are sequentially stored in the chain of blocks (called a queue) as specified by the memory manager 22. The total number of queues that can be used by the individual lines is determined by the data rates of the respective lines and is allocated to each individual line. When large volumes of data are received at a time that cannot be handled by the allocated number of queues, overflow data is placed in an empty queue (a reserve queue common to all the lines may be provided), and error information is set in the header information to indicate the occurrence of congestion. With this information, a source module that receives the data from the line can perform congestion control by signalling the congestion to a destination module (which in response speeds up the process of data reception) or by signalling the incoming line to suspend transmission of the data. Also, the destination module that is to send out the data to the outgoing line determines whether to invite or not invite the source module to transmit data, depending on the amount of the received header information and the condition of congestion at the receiving end.

When all the frame data (user data) received from the line have been stored in the data buffer 21, the data transfer processor 24 controls the memory manager 22 to read out the header (the contents of 20a in FIG. 3) in the header table 20, and transfers it on the interprocessor communication bus 3.

The destination board ID in the header output on the interprocessor communication bus 3 is monitored by the data transfer processor 24 in each of the other modules, and when the destination module detects its board ID, the data transfer processor 24 of the destination module stores the received header into the header table 20 and notifies the MPU 25 of the header storage condition. When the MPU 25 judges that the module is ready for reception, a command requesting transmission of the frame (user data) associated with the header is output from the data transfer processor 24 onto the interprocessor communication bus 3. This transmit request command includes therein part of the data (source board ID, starting descriptor number, etc.) carried in the received header.

When the data transfer processor 24 of the source module detects a transmit request command addressed to it, the memory manager 22 of the source module directs the data transfer processor 24 to transmit the requested data. Using the descriptor number included in the transmit request command, the memory manager 22 reads out data from the data buffer 21 until the descriptor chain ends, and the readout data is output from the data transfer processor 24 onto the frame transfer bus 2.

The data output on the frame transfer bus 2 is received by the data transfer processor 24 of the destination module that issued the transmit request, and as in the case of data reception from the line, the memory manager 22 formats the received data into a descriptor chain, which is stored in the data buffer 21.

When the header and user data are stored in the header table 20 and data buffer 21, respectively, in the destination module, the MPU 25 of the destination module instructs the data transfer processor 24 to return an acknowledgement, and the data transfer processor 24 sends out an acknowledgement on the interprocessor communication bus 3. In the source module, when the acknowledgement is received by the data transfer processor 24, the memory manager 22 frees the memory areas used so far in the header table 20 and data buffer 21.

On the other hand, the destination module transmits the received data onto the destination line identified by the destination board ID included in the header (stored in the header table 20). Before transmission, necessary information is set in the header in the header table 20 according to the type of destination line (terminal, LAN, interconnecting line, etc.).

Specific examples of operation sequences with the configuration illustrated in FIGS. 2 and 3 will be described next with reference to FIGS. 4 to 6.

Figure 4:
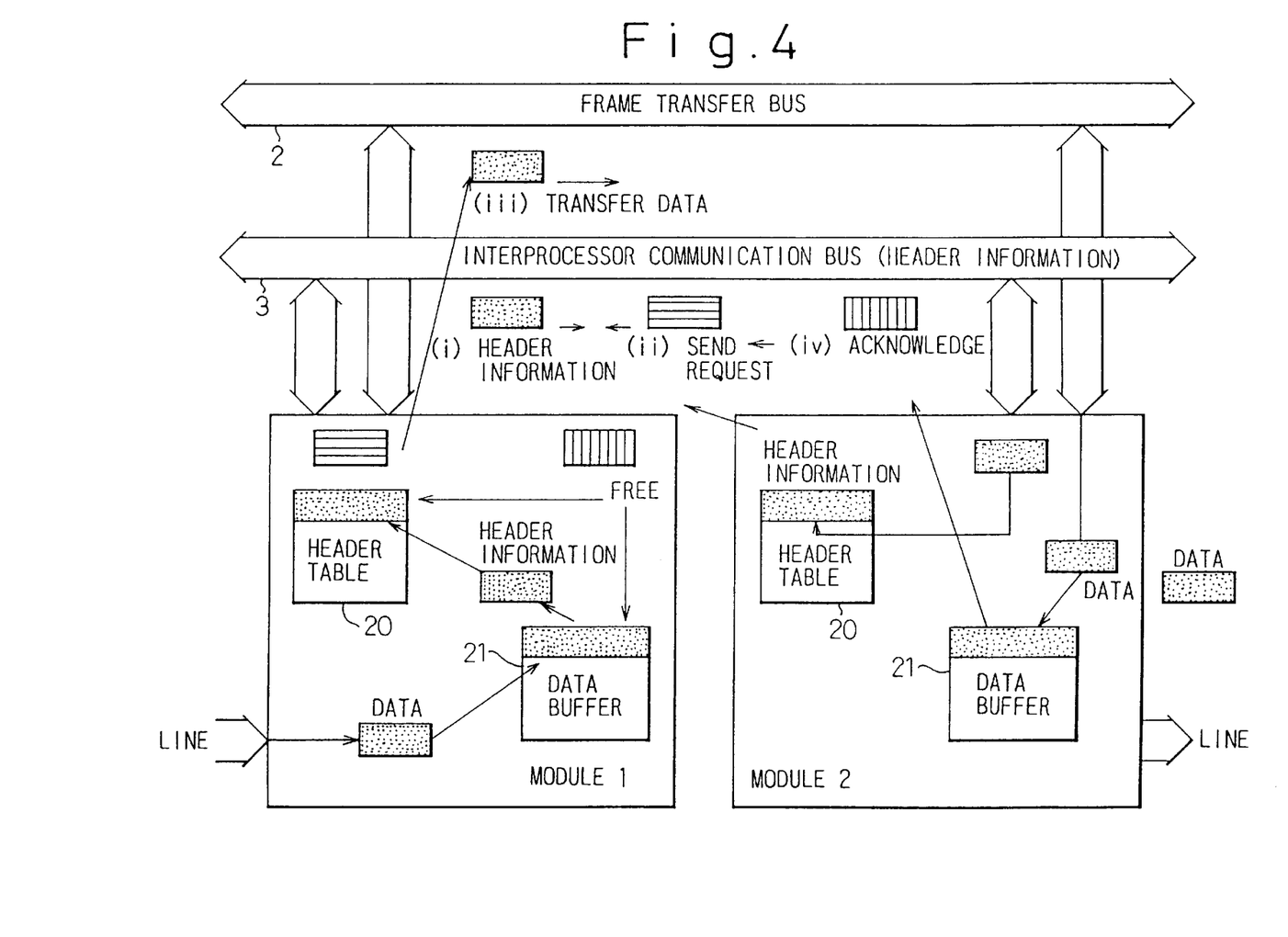
FIG. 4 is a diagram for explaining data flow in data switching between two modules.
Figure 5:
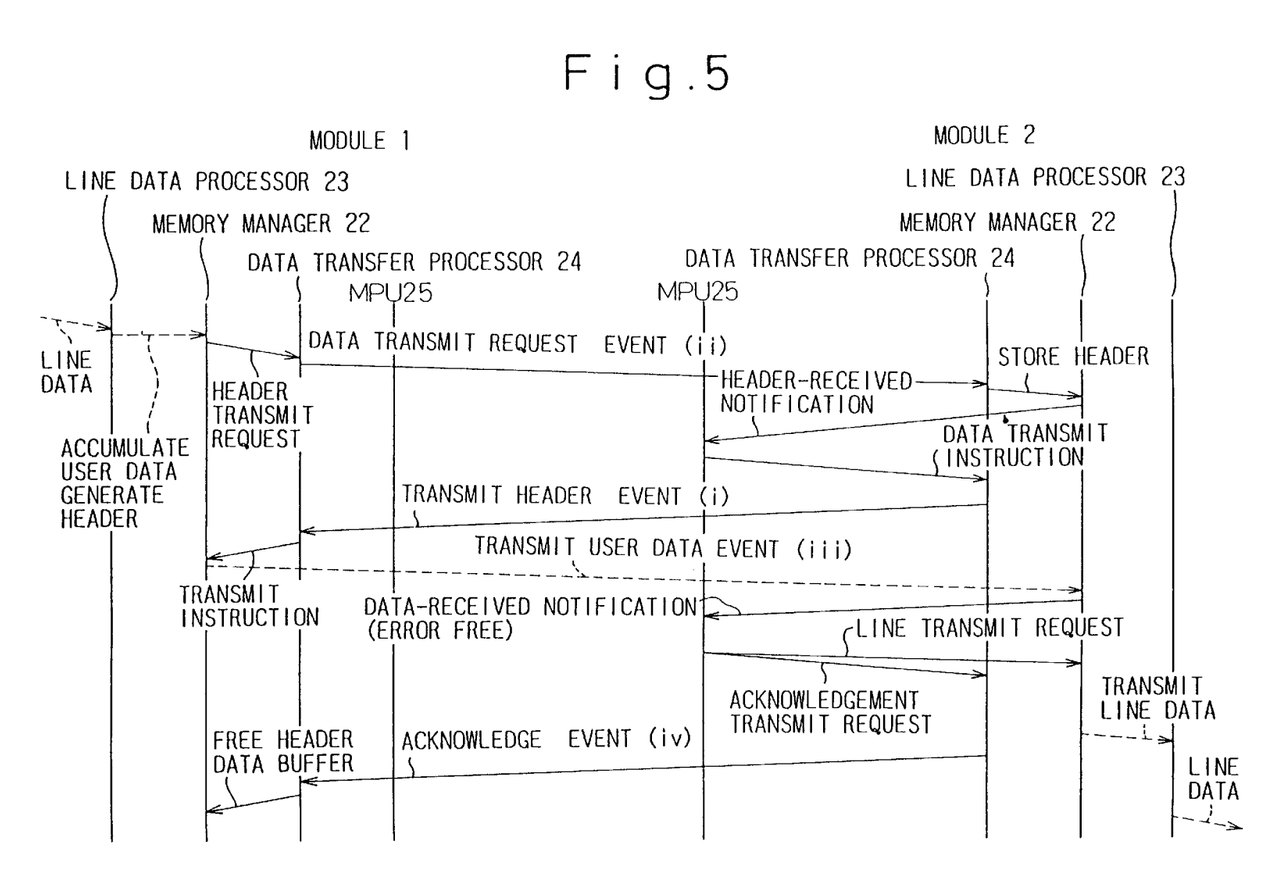
FIG. 5 is a diagram showing a data transmit-receive sequence under normal conditions.
Figure 6:
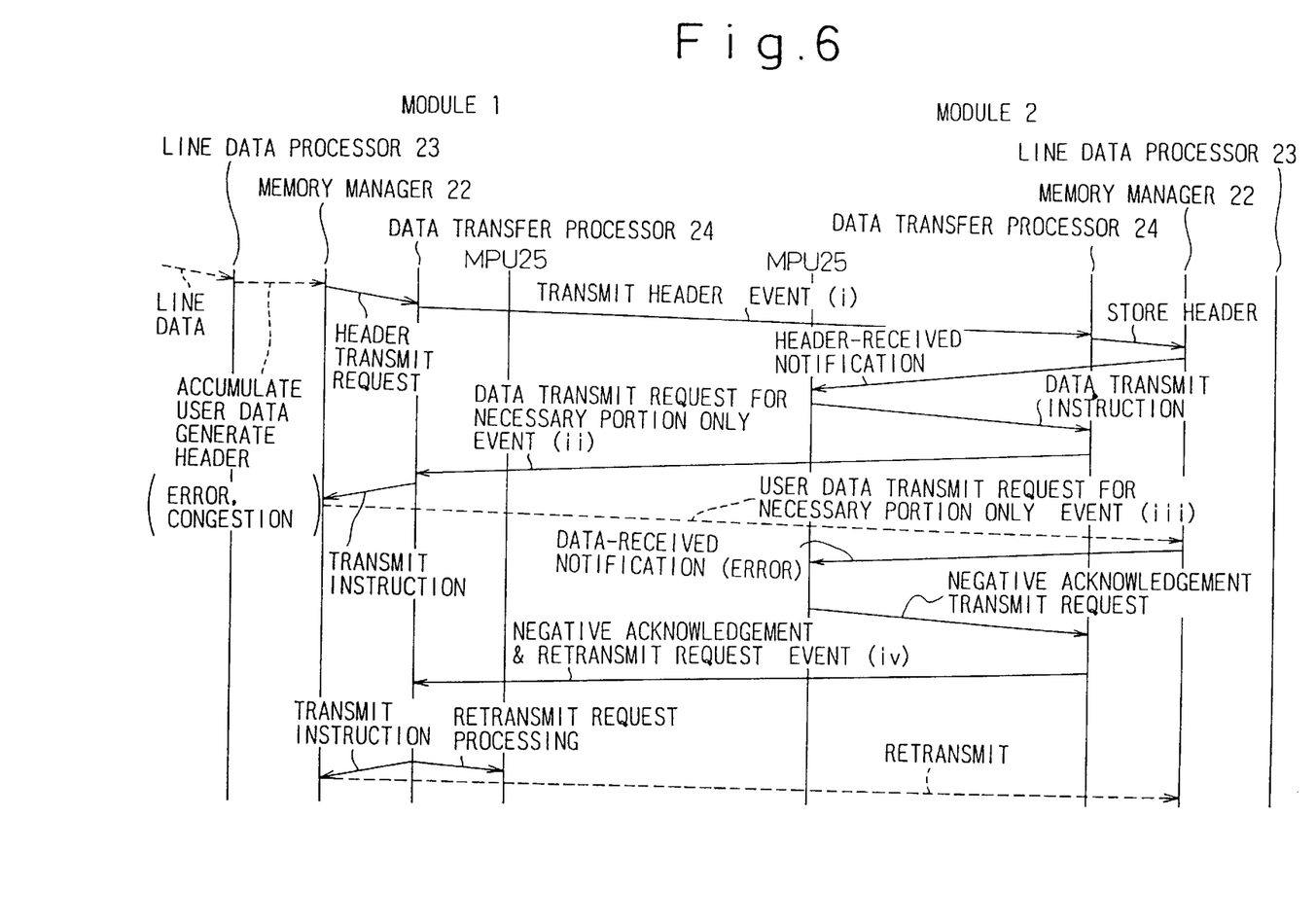
FIG. 6 is a diagram showing a data transmit-receive sequence in the event of error occurrence.

FIG. 4 is a diagram for explaining data flow in data switching between two modules, FIG. 5 shows a data transmit-receive sequence under normal conditions, and FIG. 6 shows a data transmit-receive sequence in the event of error occurrence.

The modules 1 and 2 shown in FIG. 4 are identical in configuration to the one shown in FIG. 2; in FIG. 4, only the header table 20 and data buffer 21 are shown for each module and other components are omitted. When data is received from one of the lines connected to the module 1 in FIG. 4, the line data processor 23 processes the received data and stores it in the data buffer 21 under the control of the memory manager 22, as shown in FIG. 5. In the illustrated example, it is assumed that the input data is not provided with a header. Hence, using the information indicating the source, destination, etc., included in the fixed area of user data, a header carrying the source identification, starting descriptor number, destination identification, error information, etc., is generated under the control of the memory manager 22.

The header information is then transferred on the interprocessor communication bus 3 (event (i) in FIGS. 4 and 5). At the same time, the source module 1 in the intermodule transfer operation stores a copy of the just transmitted header information in its header table 20. The module 2 that has received the header information performs an operation to request and receive the data according to the available capacity of the corresponding line. In this operation, in the module 2, upon reception of a header-received notification from the memory manager 22 the MPU 25 issues a data transmit instruction to the data transfer processor 24, as shown in FIG. 5; in response, the data transfer processor 24 sends out a data transmit request (send request) on the interprocessor communication bus 3 to the module 1 (event (ii) in FIGS. 4 and 5). The send request is accomplished either by transmitting a send request command to the MPU 25 of the module 1 to read memory by a software process or by issuing a transmit request by which memory is directly read by a hardware process, such as a direct memory access controller (DMAC).

In response to the request, the module 1 reads the requested data from its data buffer 21 by a software process or by a DMAC process, and outputs the data on the frame transfer bus 2 for transmission to the module 2 (event (iii) in FIGS. 4 and 5). When the data has been correctly received by the module 2 (the received data is error-free), the memory manager 22 of the module 2 sends a data-received notification (indicating error-free reception) to the MPU 25, as shown in FIG. 5. When the MPU 25 requests the data transfer processor 24 to send out an acknowledgement, the data transfer processor 24 outputs an acknowledgement (indicating error-free reception) on the interprocessor communication bus for transmission to the module 1 (event (iv) in FIGS. 4 and 5). At the same time, in the module 2 a request is issued to the memory manager 22 to transmit the received data to the destination line. In response to the request, the memory manager 22 performs control so that the data is output from the line data processor 23 onto the designated line. In cases where the module 2 receives data from a plurality of ports (modules), the header information received is placed in the header table in order of arrival, and is read out in order of arrival for data transmission to the designated line (the line connected to the destination equipment such as a terminal). In the module 1, when the data transfer processor 24 receives the acknowledgement, an instruction is issued to the memory manager 22 to free the header table 20 and the data buffer 21.

FIG. 6 shows a sequence in which when the module 2 has received and stored the header transferred from the module 1 (event (i) in FIG. 6) and the header reception is notified to the MPU 25, the MPU 25 instructs the data transfer processor 24 to request transmission only of the necessary portion (receivable data or meaningful data when received) in view of the available capacity of the memory (data buffer). In this case, the data transfer processor 24 of the module 2 sends out a data transmit request for the necessary portion onto the interprocessor communication bus 3 (event (ii) in FIG. 6). The module 1 that has received the transmit request transfers the data of the requested portion (event (iii) in FIG. 6).

Suppose here that, in the module 2, an error is detected in the data received by the data transfer processor 24. Then, a data-received notification (indicating an error) is sent to the MPU 25 which then instructs the data transfer processor 24 to send out a negative acknowledgement and a transmit request (including a retransmit request). The data transfer processor 24 thus returns a negative acknowledgement and a retransmit request to the module 1 (event (iv) in FIG. 6). In the module 1, when this response is received by the data transfer processor 24, the MPU 25 is notified of the request for retransmission and a retransmit instruction is given to the memory manager 22 for retransmission of the requested data.

As shown in FIG. 6, in the event of an error in the data transmission between the modules, the module 2 is able to request and receive another copy of the same data from the module 1. On the other hand, in the event of congestion (not enough space available in the data buffer 21) or the detection of an error when the module 1 has receive data from the line, error information is appended to the header information and sent to the destination module 2 which then determines whether the data in the module 1 should be discarded or a request should be made for transmission only of necessary data.

In the embodiment of the switching processing apparatus shown in FIG. 2, each module is equipped with storage sections for storing headers and data, respectively. However, when such storage sections are provided in each module, there may occur an imbalance in storage utilization depending on the data transmission condition in each module; for example, a situation may occur where when there is enough memory in one module, in another module large volumes of data are transferred at high speeds and the storage capacity of that module is exhausted. An embodiment that resolves this deficiency will be described below.

Figure 7:
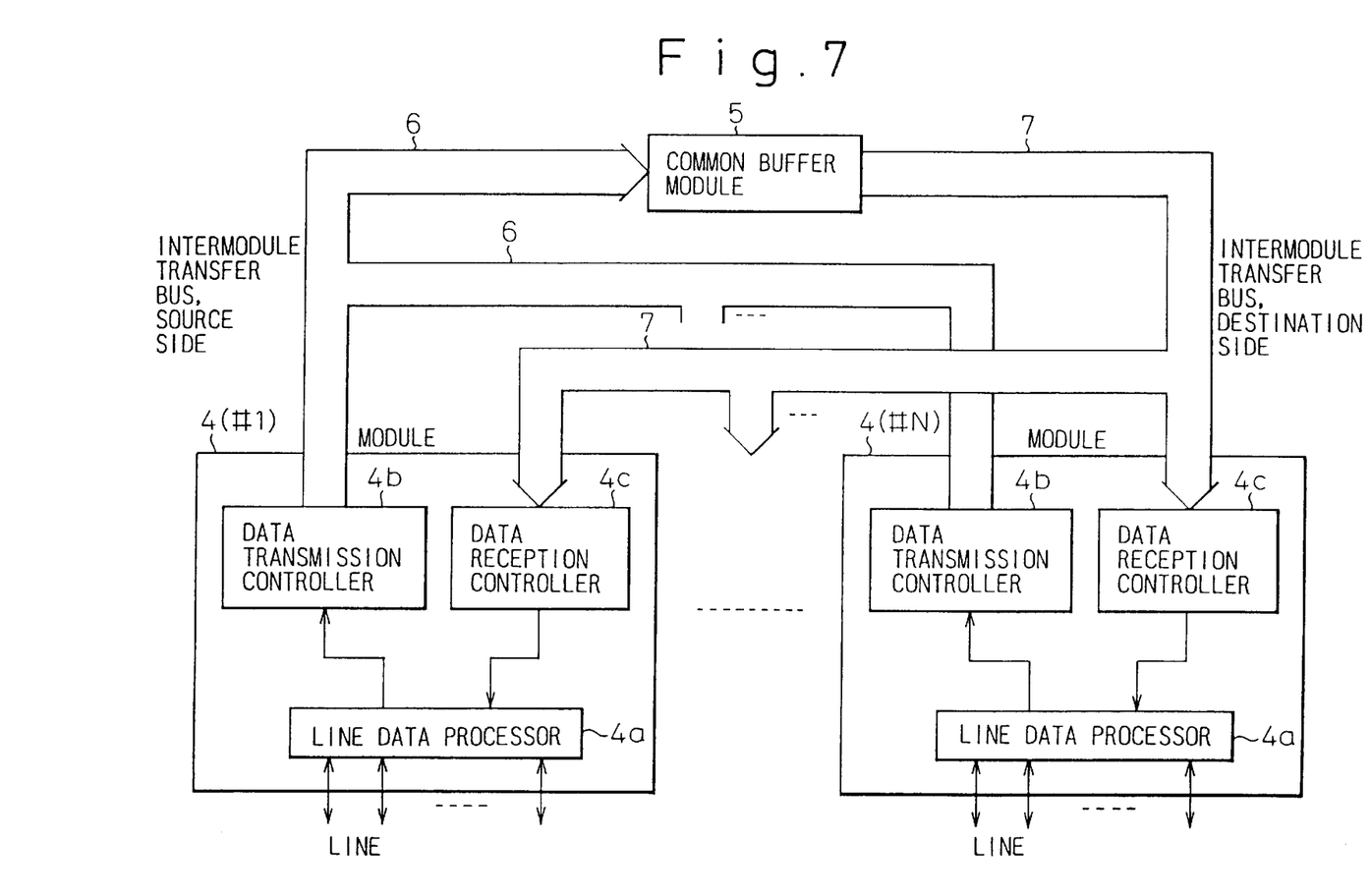
FIG. 7 is a block diagram showing an example of a switching processing apparatus equipped with a common buffer module.
Figure 8:
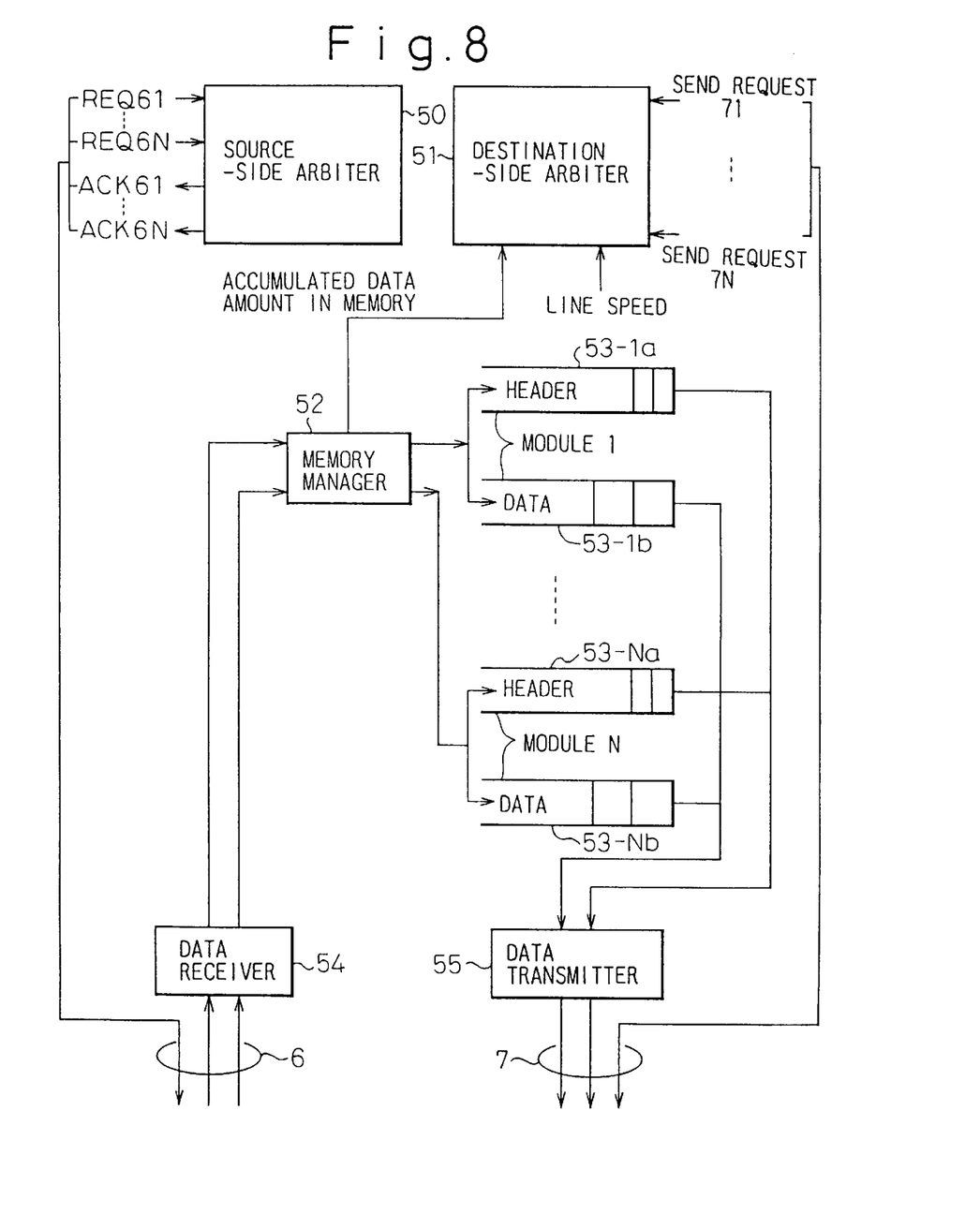
FIG. 8 is a block diagram of the common buffer module.

FIG. 7 is a block diagram showing an example of a switching processing apparatus equipped with a common buffer module, and FIG. 8 is a block diagram for the common buffer module.

In FIG. 7, reference numeral 4 represents a plurality of modules (#1–#N) and 5 indicates the common buffer module which is shared by the plurality of modules 4, while 6 designates a source-side intermodule transfer bus and 7 a destination-side intermodule transfer bus. In each module 4, 4a is a line data processor for controlling data transmission and reception to and from the lines connected to the module, 4b is a data transmission controller for performing control to transmit the data received from the lines to the common buffer module 5, and 4c is a data reception controller for performing control to request and receive data from the common buffer module 5 for transmission onto the designated line connected to the module. Each module 4 is only equipped with the minimum necessary buffer and is not equipped with any memory for data storage.

The common buffer module 5 (whose configuration will be described later with reference to FIG. 8) includes buffers which are allocated to the respective modules, the allocation being changed dynamically. The source-side intermodule transfer bus 6 and the destination-side intermodule transfer bus 7 are respectively provided with two buses, one for header transfer and the other for data (frame) transfer, which are logically separated as with the intermodule communication bus 3 and the frame transfer bus 2 shown in FIG. 2. As will be described later, the source-side intermodule transfer bus 6 includes REQ signal lines 61–6N used to transfer a signal (REQ signal) to request a right to use the bus, and ACK signal lines 61–6N used to transfer a bus-request acknowledge signal (ACK signal) from the common buffer module 5 to the requesting module 4. The destination-side intermodule transfer bus 7 includes signal lines 71–7N used to transfer a send request to the common buffer module 5.

In the common buffer module 5, bus arbitration (arbitration of use of the bus) is performed for the source-side intermodule transfer bus 6.

The operation in FIG. 7 will be described. When data is input to the module 4 from one of the line, the line data processor 4a instructs the data transmission controller 4b to acquire a right to use the source-side intermodule transfer bus 6. When the right is acquired, the received data is transmitted from the data transmission controller 4b to the common buffer module 5 via the source-side intermodule transfer bus 6. At this time, if the received data from the line does not include a header, the destination address contained at the head of the data is identified and a header containing the destination module ID is generated, in a manner similar to the operation of the module of FIG. 2, and the header and the user data are transmitted to the common buffer module 5 via the source-side intermodule transfer bus 6. When the received data from the line includes a header, the header is converted, if necessary, to a header for intermodule transfer.

In the common buffer module 5, the header and user data received via the source-side intermodule transfer bus 6 are stored in the buffer area allocated to the destination module by identifying the module by reference to the header. The header stored in the buffer area is output from the common buffer module 5 onto the destination-side intermodule transfer bus 7. When the data reception controller 4c in the destination module 4 detects the header addressed to it, the destination module 4 issues a send request to the common buffer module 5 for transmission of the corresponding data.

In response to the send request, if the bus is available for use, the common buffer module 5 reads the requested data from the corresponding buffer area and transmits it on the destination-side intermodule transfer bus 7. The module 4 that issued the send request receives the data in the data reception controller 4c and transmits it on the destination line via the line data processor 4a.

The common buffer module configuration of the embodiment shown in FIG. 8 will be described below. In FIG. 8, reference numeral 50 is a source-side arbiter for arbitrating uses of the source-side intermodule transfer bus 6 (see FIG. 7); 51 is a destination-side arbiter for arbitrating uses of the destination-side intermodule transfer bus 7 (see FIG. 7); 52 is a memory manager for controlling the writing and reading of header and data to and from the buffer area mapped to each module, which will be described later; 53-1a/53-1b to 53-Na/53-Nb are buffers allocated to the modules 4 of corresponding numbers (#1 to #N), 53-1a to 53-Na being header buffers for storing headers and 53-1b to 53-Nb data buffers for storing data; 54 is a data receiver, connected to the source-side intermodule transfer bus 6 in FIG. 7, for receiving data transmitted from each module; and 55 is a data transmitter for transmitting data to each module connected thereto via the destination-side intermodule transfer bus 7 in FIG. 7.

The source-side arbiter 50 in the common buffer module receives, from the plurality of modules 4 (#1–#N) shown in FIG. 7, signals requesting a right to use the source-side intermodule transfer bus 6 via the respective signal lines REQ61–REQ6N, and outputs a bus-request acknowledge (ACK) signal on one of the signal lines ACK61–ACK6N to one of the modules 4. On the other hand, the destination-side arbiter 51 receives send requests from the plurality of modules 4 (#1–#N) shown in FIG. 7 via the respective send-request signal lines 71–7N, and if the bus is available for use, allows the requesting module to proceed with transmission.

When a send request occurs from one of the modules 4 shown in FIG. 7, the source-side arbiter 50 allocates priorities in order of request occurrence or in round-robin fashion, and outputs a request acknowledge signal on the corresponding ACK signal line, in response to which the header and user data are transmitted from the data transmission controller 4b of the request-granted module 4, which are received by the data receiver 54 in FIG. 8.

The header received by the data receiver 54 is analyzed to identify the destination module ID which is then notified to the memory manager 52. It is assumed here that the destination module is identified as the module 4 (#N). The memory manager 52 stores the received header in the header buffer 53-Na mapped to the module #N and the user data in the data buffer 53-Nb. The data are stored by the same descriptor chain method as employed for the data buffer shown in FIG. 2.

When the header is stored in one of the header buffers 53-1a to 53-Na, the data transmitter 55 of the common buffer module transfers the header on the destination-side intermodule transfer bus 7. The module 4 (#N) that has detected the header that matches its own ID transmits a send request to the common buffer module. Upon receiving the request, the destination-side arbiter 51 checks the line speed of the receiving module 4 (#N) and the accumulated data amount in the data buffer 53-Nb for the module 4 (#N), based on which data transfer is initiated. More specifically, if there is contention among send requests from more than one module, priority is granted to the module for which the data amount accumulated in the buffer is larger or whose line speed is higher than any other module in contention. This permits a reduction in the necessary buffer amount of the common buffer module 5, since the amounts of data accumulated in the data buffers 53-1b to 53-Nb in the common buffer module 5 can be reduced in the shortest possible time.

The data transmitter 55 instructs the memory manager 52 and reads out the data accumulated in the data buffer 53-Nb mapped to the destination module 4 (#N), for transmission on the destination-side intermodule transfer bus 7. The data is transferred into the module 4 (#N) and sent out to the destination line.

According to the switching processing apparatus comprising the modules 4 and the common buffer module 5 shown in FIGS. 7 and 8, the burden of the modules 4 that process transmission and reception to and from the lines is greatly alleviated, especially for processing data reception from the lines, as compared with the modules 1 shown in FIGS. 1 and 2; furthermore, the total buffer capacity can be drastically reduced as compared to the combined buffer capacity of the modules 1 shown in FIG. 2. If the switching network system shown in FIG. 1 is constructed using the switching processing apparatus having the configuration shown in FIGS. 7 and 8, in each switching processing apparatus several tens of modules may be provided per common buffer module depending on the system configuration. It is apparent that the effect of reducing the buffer capacity is enormous.

The switching processing apparatus shown in FIG. 7 can be expanded to construct a large-scale switching processing apparatus. FIG. 10 is a diagram showing an implementation of the expanded common buffer module configuration.

Figure 9:
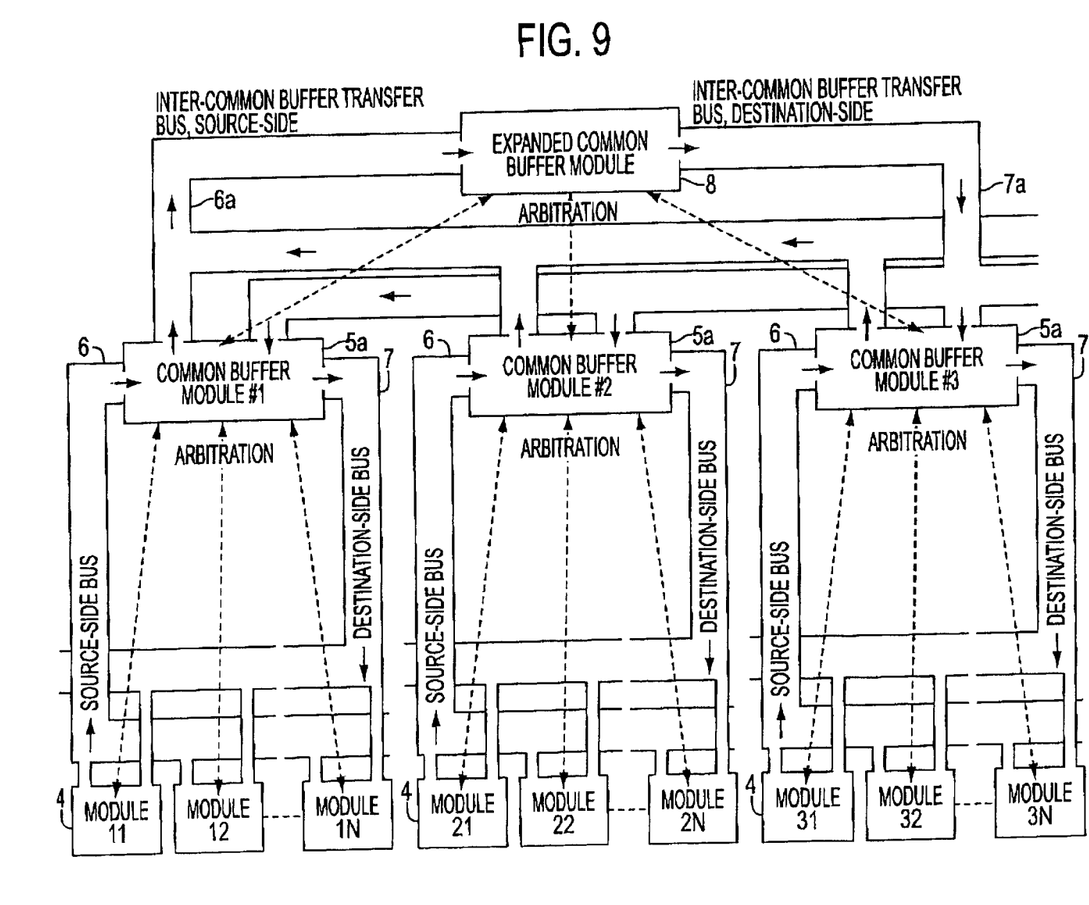
FIG. 9 is a diagram showing an expanded configuration constructed using common buffer modules.

In FIG. 9, reference numeral 5a represents a common buffer module equipped with a facility for controlling access to and from higher-level buses in addition to the facilities described with reference to FIG. 8; numerals 6 and 7 are the same as those shown in FIG. 7, i.e., the source-side intermodule transfer bus and the destination-side intermodule transfer bus, respectively; and 8 designates an expanded common buffer module for performing data switching between a plurality of common buffer modules 5a, that is, between a plurality of switching processing apparatus. Though the internal configuration is not shown here, the expanded common buffer module 8 includes data buffers for storing headers and data, a memory manager, a source-side arbiter, a destination-side arbiter, etc., as with the one shown in FIG. 7. Further, reference numeral 6a is a source-side inter-common buffer module transfer bus for transferring data from the plurality of common buffer modules 5a to the expanded common buffer module 8, and 7a is a destination-side inter-common buffer module transfer bus for transferring data from the expanded common buffer module 8 to each individual common buffer module 5a.

In the configuration of FIG. 9, the common buffer modules 5a are provided in large numbers, #1, #2, #3, and so on, and are each equipped with a number, N, of modules 4 (11–1N, 21–2N, 31–3N, and so on), each module 4 being identical to the one shown in FIG. 7. One or more lines (not shown) are connected to each module 4.

As compared with the common buffer module configuration shown in FIG. 8, each common buffer module 5a is provided with an additional facility for accessing the source-side and destination-side buses for data transmission and reception to and from the expanded common buffer module 8. The expanded common buffer module 8 is similar in configuration to that shown in FIG. 8, and performs processing to receive a request for a right to use the bus from each individual common buffer module 5a, grant the bus request, and receive data. Also, in response to a send request, data is transmitted to the destination side of the requesting common buffer module 5a according to the line speed and the accumulated data amount, as previously described.

The operation according to the configuration of FIG. 9 will be described below. Consider the situation where the module 11 connected to the common buffer module 5a (#1) at the lower left of the figure sends out data on a line connected to it and the destination of the data is a line connected to the module 31 belonging to another common buffer module 5a (#3). First, the module 11 receives data from a line, sets the ID of the module 31 in the header, and transmits the header to the common buffer module 5a (#1) via the source-side intermodule transfer bus 6. In the common buffer module 5a (#1), if the received data is addressed to one of the modules (11–1N) connected to it, the data is stored in the buffer area mapped to the addressed module. Any data addressed to other modules are transferred to the expanded common buffer module 8 (or is once stored in an empty buffer in the common buffer module 5a and then transferred to a buffer in the expanded common buffer module 8).

If the common buffer module 5a (#1) detects that the destination is a module (the module 31) belonging to another common buffer module 5a (#3) by examining the destination ID (included in the header or at the head of the user data area), the common buffer module 5a (#1) sends a request signal (REQ signal) to the expanded common buffer module 8, requesting a right to use the source-side inter-common buffer module transfer bus 6a. When the bus request is granted (an ACK signal is returned), the header and user data are transferred via that bus and stored in the buffer allocated to the destination common buffer module 5a.

When the header is stored in the buffer, the expanded common buffer module 8 outputs a copy of the header on the destination-side inter-common buffer module transfer bus 7a for transmission to the designated common buffer module 5a. Upon detection of the header, the common buffer module 5a at the destination end stores the header in a buffer and transmits a send request to the expanded common buffer module 8. In response, the expanded common buffer module 8 transmits the requested data via the destination-side inter-common buffer module transfer bus 7a to the requesting common buffer module 5a where the data is stored in a buffer. The data (header and user data) stored in the common buffer module 5a is transferred to the designated module 31 for transmission on to the destination line, as previously described. In this manner, a large-scale switching processing apparatus accommodating a large number of lines can be constructed.

The switching processing apparatus of the invention has the following advantages.

(i) Processing at the source end is alleviated.

(ii) Since congestion control can be performed at both the source and destination ends, needless duplication of buffers is eliminated.

(iii) Congestion control can be accomplished easily since data is read from the data buffer and output on the outgoing line at a rate that matches the line speed.

(iv) Since unnecessary data transfers are not performed between modules, bus throughput for data transfer is improved.

(v) No retransmission occurs between modules due to the buffer being busy at the destination end (because data is transmitted from the source end according to the amount of available buffer space at the destination end).

(vi) By providing a common buffer module for a plurality of modules, a buffer busy situation can be prevented if a large volume of data transfer occurs at a time, and the buffer capacity can be drastically reduced as compared with a configuration requiring the provision of buffers within each module.

(vii) Using an expanded common buffer module, a plurality of switching processing apparatus, each consisting of a plurality of modules interconnected by a common buffer module, can be combined to construct a larger switching processing apparatus, so that system expansion can be easily implemented.

What is claimed is:

1. A data switching processing method for switching a data unit including a header and a data frame and transmitted over a plurality of communication lines by transferring said data unit from a source module that receives the data unit from a communication line connected thereto to a destination module connected to a communication line on which the data unit is to be transferred in accordance with addressing information included in said data unit, comprising the steps of:

a) extracting from said data unit the header containing information for identifying the destination module;

b) transferring said header to the destination module identified by said information;

c) issuing from said destination module a send request requesting the transmission of said data frame to said destination module in response to the transfer of said header; and d) transferring said data frame to said destination module in response to said send request.

2. A method according to claim 1, further comprising the step of e) storing said data frame and the header extracted from the data unit in said source module,
wherein
in step b), said header is transferred from said source module,
in step c), said send request is issued to said source module, and
in step d), said data frame is transferred from said source module.

3. A method according to claim 2, wherein said header further includes information for identifying the source module and a location where the data frame associated with said header is stored.

4. A method according to claim 3, wherein said header further includes information on an error contained in the data frame associated with said header.

5. A method according to claim 2, wherein said header, said send request, and said data frame are transferred between two specific modules via a common bus interconnecting a plurality of modules.

6. A method according to claim 1, further comprising the step of e) storing said data frame and the header extracted from the data unit in a single common buffer module provided common to all modules,
wherein
in step b), said header is transferred from said common buffer module,
in step c), said send request is issued to said common buffer module, and
in step d), said data frame is transferred from said common buffer module.

7. A method according to claim 6, wherein said header further includes information for identifying the source module and a location where the data frame associated with said header is stored.

8. A method according to claim 7, wherein said header further includes information on an error contained in the data frame associated with said header.

9. A method according to claim 6, wherein
in step e), said data frame and said header are transferred from said source module to said common buffer module via a first common bus which interconnects a plurality of modules and said common buffer module, and
said header in step b) and said data frame in step d) are transferred from said common buffer module to one of the modules at destination end via a second common bus interconnecting said plurality of modules and said common buffer module.

10. A method according to claim 9, wherein when, in step d), there is more than one module at destination end contending for the transfer of data frames, the data frames are transferred in accordance of priority determined for each of said contending modules on the basis of the amount of accumulated data frames in said common buffer module and the line speed concerned.

11. A method according to claim 1, wherein each of a plurality of common buffer modules is connected to a plurality of modules, and an expanded common buffer module is connected to said plurality of common buffer modules, further comprising the step of e) when said source module and said destination module are connected to the same common buffer module, storing said data frame and the header extracted from the data frame in said same common buffer module, and when said source module and said destination module are connected to different common buffer modules, storing the same in the common buffer module connected to said destination module by way of the common buffer module connected to said source module and said expanded common buffer module,
wherein
in step b), said header is transferred from the common buffer module connected to said destination module,
in step c), said send request is issued to said common buffer module, and
in step d), said data frame is transferred from said common buffer module.

12. A data switching processing apparatus for switching a data unit including a header and a data frame and transmitted over a plurality of communication lines by transferring said data unit from a source module that receives the data unit from communication line connected thereto to a destination module connected to a communication line on which the data unit is to be transferred in accordance with addressing information included in said data unit, comprising:

means for extracting from said data unit the header containing information for identifying the destination module;

means for transferring said header to the destination module identified by said information;

means for issuing from said destination module a send request requesting the transmission of said data frame to said destination module in response to the transfer of said header; and means for transferring said data frame to said destination module in response to said send request.

13. An apparatus according to claim 12, further comprising mans for storing said data frame and the header extracted from the data unit in said source module,
wherein
said header transfer means transfers said header from said source module,
said send request issuing means issues said send request to said source module, and
said data unit transfer means transfers said data frame from said source module.

14. An apparatus according to claim 13, wherein said header further includes information for identifying the source module and a location where the data frame associated with said header is stored.

15. An apparatus according to claim 14, wherein said header further includes information on an error contained in the data frame associated with said header.

16. An apparatus according to claim 14, wherein said header is transferred on an interprocessor communication bus.

17. An apparatus according to claim 16, wherein said header includes a destination board identifier, a source board identifier and a starting descriptor number, as the information for identifying the destination module, the source module and the location of the data frame, respectively.

18. An apparatus according to claim 17, wherein said data frame storing means includes a memory manager that divides the data frame into a plurality of data blocks and stores the data blocs at a plurality of memory locations indicated by a chain of descriptors which are indicated by said starting descriptor number.

19. An apparatus according to claim 18, wherein said data frame transferring means activates said memory manager that successively reads out said data blocks according to said chain of descriptors to transfer the data frame on a frame transfer bus.

20. An apparatus according to claim 16, wherein said header includes data size.

21. An apparatus according to claim 13, wherein said header, said send request, and said data frame are transferred between two specific modules via a common bus interconnecting a plurality of modules.

22. An apparatus according to claim 12, further comprising a single common buffer module, provided common to all modules, for storing said data frame and the header extracted from the data unit,
wherein
said header transfer means transfers said header from said common buffer module,
said send request issuing means issues said send request to said common buffer module, and
said data frame transfer means transfers said data frame from said common buffer module.

23. An apparatus according to claim 22, wherein said header further includes information for identifying the source module and a location where the data frame associated with said header is stored.

24. An apparatus according to claim 23, wherein said header is transferred on an interprocessor communication bus.

25. An apparatus according to claim 24, wherein said header includes a destination board identifier, a source board identifier and a starting descriptor number, as the information for identifying the destination module, the source module and the location of the data frame, respectively.

26. An apparatus according to claim 25, wherein said data frame storing means includes a memory manager that divides the data frame into a plurality of data blocks and stores the data blocks at a plurality of memory locations indicated by a chain of descriptors which are indicated by said starting descriptor number.

27. An apparatus according to claim 26, wherein said data frame transferring means activates said memory manager that successively reads out said data blocks according to said chain of descriptors to transfer the data frame on a frame transfer bus.

28. An apparatus according to claim 24, wherein said header includes data size.

29. An apparatus according to claim 23, wherein said header further includes information on an error contained in the data frame associated with said header.

30. An apparatus according to claim 22, further comprising a first common bus which interconnects a plurality of modules and said common buffer module, said data frame and said header being transferred from said source module to said common buffer module via said first common bus, and a second common bus, interconnecting said plurality of modules and said common buffer module, for transferring said data frame and said header from said common buffer module to one of the modules at destination end.

31. An apparatus according to claim 30, wherein when there is more than one module at destination end contending for the transfer of data frames, said data frame transfer means transfers the data frames in accordance of priority determined for each of said contending modules on the basis of the amount of accumulated data frames in said common buffer module and the line speed concerned.

32. An apparatus according to claim 12, further comprising a plurality of common buffer modules, each connected to a plurality of modules, and an expanded common buffer module connected to said plurality of common buffer modules, and means for storing said data frame and the header extracted from the data frame in one common buffer module when said source module and said destination module are both connected to said one common buffer module, and storing the same in the common buffer module connected to said destination module by way of the common expanded common buffer module when said source module and said destination module are connected to different common buffer modules,
wherein
said header transfer means transfers said header from the common buffer module connected to said destination module,
said send request issuing mans issues said send request to said common buffer module, and
said data frame transfer means transfers said data frame from said common buffer module.

* * * * *